Inventor:
Harold T. Faus,
by Prowell F. Mack
His Attorney.

Patented Dec. 13, 1949

2,491,305

UNITED STATES PATENT OFFICE 2,491,305

CONSTANT CURRENT REGULATOR USING A PERMANENT MAGNET AS A STANDARD

Harold T. Faus, Lynn, Mass., assignor to General Electric Company, a corporation of New York Application January 22, 1948, Serial No. 3,697

4 Claims. (Cl. 323—16)

My invention relates to apparatus for obtaining a very constant direct current voltage or current such, for example, as may take the place of a standard cell for measurement and control purposes. In carrying my invention into effect, I employ a current control device in which the flux of a coil carrying the current to be controlled is compared to the flux of a stabilized permanent magnet in a deflection type instrument which has a response depending upon the directional difference of such fields. A control includes instrumentalities for maintaining the two fields equal and hence the current constant.

The features of my invention which are believed to be novel and patentable will be pointed out in the claims appended hereto. For a better understanding of my invention reference is made in the following description to the accompanying drawing in which Fig. 1 represents the apparatus and circuit diagram of a constant voltage source system embodying my invention, and Fig. 2 is an explanatory diagram of the flux fields in the control instrument of Fig. 1.

Figure 1:
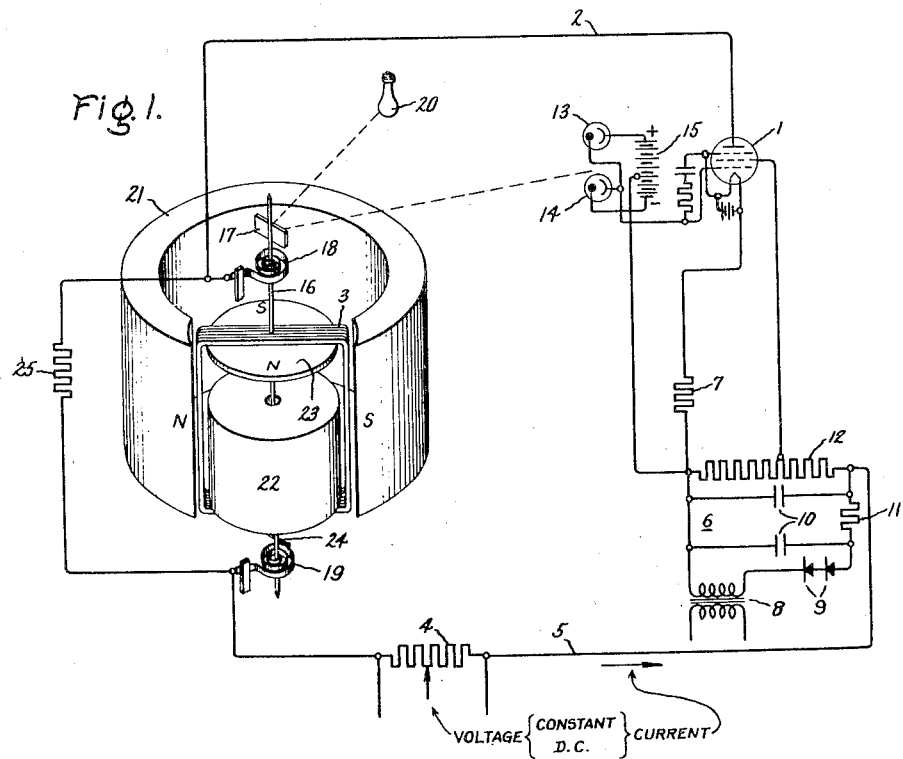

In Fig. 1 of the drawing there is shown a main current circuit containing a current regulating electronic tube 1, plate connected wire 2, moving coil 3 of a deflection type control instrument, resistance 4, wire 5, a suitable direct current supply at 6, and the wire containing a resistance 7 completing the circuit to the cathode of tube 1. The direct current supply at 6 may be of any suitable type. As shown, it consists of a rectified source of alternating current voltage, including a transformer 8, series rectifiers 9, and impulse smoothing condensers 10 and resistance 11. Connected across this D.-C. source 6 is a resistance 12 for obtaining a suitable screen grid voltage for the pentode control tube 1. The amount of current that is allowed to flow through the circuit described is governed by the tube 1, and this tube is subject to the control of a split beam photocell control system, including the instrument having the moving coil 3. The control is such as to maintain the current through resistance 4 constant and hence the voltage across such resistance will be constant. The control grid of tube 1 is connected between two photocells 13 and 14 which are in series across a battery 15. The midpoint of the battery 15 has a connection to the cathode of tube 1 through resistance 7, and there are a condenser and resistance in series between the cathode and control grid of tube 1. The control is such that lowering the resistance of phototube 14 as compared to the resistance of phototube 13 causes a decrease in current through tube 1 and vice versa. The moving coil 3 of the instrument is on a shaft 16 carrying a mirror 17 and lead-in spirals 18 and 19 for the coil 3. A light source 20 directs a beam of light onto mirror 17 and the beam is reflected therefrom toward the photocells 13 and 14, such that the light distribution between the cells depends upon the rotary position of shaft 16. The instrument is of the direct current type having stationary field producing means which is preferably a permanent magnet 21 and stationary core 22 separated by an air gap in which the coil 3 is located. The moving coil system of this instrument also carries a permanent magnet 23 which is shown in the form of a circular disk fastened inside of the coil and symmetrical with the coil and shaft. The permanent magnet 23 is polarized to produce a flux diametrically opposite to the flux produced by moving coil 3 when current flows therein, and under normal conditions the field produced by the coil is equal to the field produced by magnet 23 in their influence on instrument deflection.

Figure 2:

Thus, in Fig. 2, arrow 21a may represent the air gap field produced by permanent magnet 21, 3a the field produced by coil 3, and 23a the field produced by magnet 23, except that arrows 3a and 23a should be superimposed one on the other but are separated for representation purposes. When the two fields 3a and 23a are equal and opposite, the instrument has no torque and the mirror is then positioned so that the light distribution on the cells 13 and 14 is equal, and the circuit constants and bias of tube 1 are such as to cause a current flow in coil 3 which just neutralizes the field of magnet 23. It will now be apparent that if for any reason the current in coil 3 tends to increase, the coil 3 will turn slightly clockwise and cause more light to strike photocell 14 and less to strike photocell 13, thereby decreasing the current flow through tube 1 and coil 3 until the field produced by coil 2 is again equal to that of magnet 23. On the other hand, if the current in coil 3 decreases from the value to equalize the magnet 23, the armature will turn counterclockwise and increase the current through coil 3 to the equalizing value. The torque of the lead-in spirals is made as low as possible or completely neutralized in some way as, for example, by a small bar of iron 24 to be positioned at right angles to the stationary field when the armature is in the correct regulating position.

It is now apparent that the operation of this regulator depends for its operation upon the comparison of the field produced by the regulated current flowing in coil 3 with the field of permanent magnet 23. The comparing means is the same for both of these fields. Thus both act on the same permanent magnet field produced by magnet 21 and use the same suspension system, consisting of the shaft 16 with its pivots, spirals, etc. Hence the scheme has inherently high accuracy. This accuracy depends primarily on the constancy of the field of permanent magnet 23, and I prefer to use a high grade of permanent magnet material of high coercive force in 23 which after polarization has been carefully stabilized so as to remain at a fixed value. In case the field of permanent magnet 23 tends to change with change in ambient temperature, it may be compensated for by employing a resistance 25 of the right characteristics in shunt to coil 3 such that if the field of 23 tends to weaken with rise in temperature, a corresponding percentage of the total current in resistance 4 will be shunted from coil 3. Thus if the coil 3 is made of copper, the shunt 25 may be made of a material having a negligible temperature coefficient of resistance and of the correct resistance as compared to the resistance of coil 3 to shunt the desired percentage of compensating current.

Changes in field strength of the stationary permanent magnet 21 will have no effect on the operation. There remains the possibility that a change in temperature may change the permeability of the magnetic materials used. To avoid errors from this cause, the permanent magnet 23 is preferably made circular as shown instead of elongated, and since its plane is parallel to the field of the stationary magnet it will have the same permeability across all diameters, and hence will not be rotatively influenced by changes in its own permeability or that of the magnet circuits with which it is associated. In any case where external fields may be bothersome, the instrument may be shielded therefrom in the usual manner. A high sensitivity instrument response is desirable and is easily accomplished. For instance, the current change necessary to operate the controller over its control range may be of the order of $\frac{1}{100}$ of one per cent of the value of the current in the controlled circuit. The value of the constant current in the circuit 5 depends upon the strength of permanent magnet 23 and the number of turns in winding 3 and the percentage of current shunted through 25. These factors may be made to produce the desired current strength with high sensitivity and accuracy. Ordinary expected changes in the voltage supply at 6 will not produce error.

What I claim as new and desire to secure by Letters Patent of the United States is:

1. A constant current producing system comprising a source of direct current supply, a circuit supplied from said source, current regulating apparatus in said circuit and a control instrument for said regulator in said circuit, said control instrument having stationary unidirectional field producing means and an armature member pivoted in said field, said armature having a coil connected in said circuit and a permanent magnet for producing a field which opposes the field produced by the coil, the resultant of said opposed armature fields reacting with the stationary field of the instrument to produce an armature deflecting torque which is zero when the opposed armature fields are equal, and means responsive to the deflection of said armature for controlling said current regulating apparatus in a manner to increase the current in said circuit when the permanent magnet field of the armature predominates and to decrease the current in said circuit when the coil field of the armature predominates.

2. A constant current regulating system comprising a source of supply, a circuit supplied thereby, electronic current regulating apparatus in said circuit, a control instrument for said apparatus comprising a stationary permanent magnet field member and an armature pivoted for rotation in the field produced by said member, said armature comprising a coil included in said circuit and a permanent magnet which opposes the field of the coil, the resultant field of said armature elements reacting with said stationary field to produce a deflecting torque in said control instrument which torque is zero when said two opposed armature fields are equal, and means responsive to the deflection of said armature for controlling said electronic current regulator in a manner to increase the current in said armature coil when its field is less than that of the armature permanent magnet and to decrease such current when the armature coil field is greater than that of the armature permanent magnet.

3. In a constant current regulating system, a control instrument comprising a stationary permanent magnet field member containing an armature air gap across which a field is produced, an armature pivoted for rotation in said air gap, said armature including a coil adapted to be energized in proportion to the current of such system, and a permanent magnet secured in fixed relation to said coil which opposes the field produced by said coil, the resultant field of said armature permanent magnet and coil reacting with the air gap field produced by the stationary permanent magnet to produce instrument torque which torque is zero when the opposed armature fields are equal, said armature permanent magnet comprising a circular disk polarized across a diameter with the plane of the disk lying parallel with the direction of the air gap field, said disk being centered with and perpendicular to the axis of rotation of said armature.

4. In a constant current regulating system, a direct current type control instrument having a stationary permanent magnet field member and a pivoted armature subject to the field of the stationary magnet, said armature comprising a coil adapted to be energized in proportion to the current of such system and a permanent magnet in fixed relation to said coil which produces a field in opposition to the field produced by the coil, the resultant of said two fields reacting with the field of the stationary permanent magnet to produce instrument deflecting torque which is zero when the two armature fields are equal, and means for compensating for changes in strength of the armature permanent magnet due to temperature changes, comprising a circuit connected in shunt to said coil having a temperature coefficient of resistance which differs from the temperature coefficient of resistance of the coil by an amount and character such that when the temperature changes, the total current in coil and shunt remains constant for the zero armature torque condition.

HAROLD T. FAUS.

REFERENCES CITED

The following references are of record in the file of this patent:

UNITED STATES PATENTS

| Number | Name | Date |
| --- | --- | --- |
| 634,965 | Thomson | Oct. 17, 1899 |
| 1,754,085 | Faus | Apr. 8, 1930 |
| 1,939,443 | Geiselman | Dec. 12, 1933 |
| 1,962,353 | Kovalsky | June 12, 1934 |
| 2,049,669 | Smith | Aug. 14, 1936 |
| 2,136,682 | Gilbert | Nov. 15, 1938 |